United States Patent
Hsu et al.

(10) Patent No.: US 12,047,405 B2
(45) Date of Patent: Jul. 23, 2024

(54) DYNAMICALLY THROTTLING SNAPSHOT CAPTURE RATES

(71) Applicant: International Business Machines Corporation, Armonk, NY (US)

(72) Inventors: Yu-Cheng Hsu, Tucson, AZ (US); Sridhar Muppidi, Austin, TX (US); Sandeep Ramesh Patil, Pune (IN); Sasikanth Eda, Vijayawada (IN); Deepak R. Ghuge, Sangamner (IN)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 17/499,697

(22) Filed: Oct. 12, 2021

(65) Prior Publication Data
US 2023/0115045 A1  Apr. 13, 2023

(51) Int. Cl.
*H04L 9/40* (2022.01)
*G06F 11/14* (2006.01)

(52) U.S. Cl.
CPC ...... *H04L 63/1433* (2013.01); *G06F 11/1461* (2013.01); *G06F 2201/84* (2013.01)

(58) Field of Classification Search
CPC ............ G06F 11/1461; G06F 11/3006; G06F 11/3438; G06F 21/552; G06F 21/554; G06F 21/57; G06F 2201/84; H04L 63/1433
See application file for complete search history.

(56) References Cited

U.S. PATENT DOCUMENTS

| | | | |
|---|---|---|---|
| 10,021,120 B1 * | 7/2018 | Salour | G06F 11/2094 |
| 10,037,341 B1 | 7/2018 | Bassov et al. | |
| 2010/0198636 A1 * | 8/2010 | Choudhary | G06F 21/552 726/1 |
| 2012/0144492 A1 * | 6/2012 | Griffin | G06F 21/56 726/25 |
| 2014/0006354 A1 * | 1/2014 | Parkison | G06F 16/183 707/661 |
| 2017/0177867 A1 * | 6/2017 | Crofton | G06F 21/565 |
| 2018/0024892 A1 | 1/2018 | Mutha et al. | |
| 2019/0377802 A1 | 12/2019 | Haber et al. | |
| 2020/0201995 A1 * | 6/2020 | Gahlot | G06F 21/6218 |
| 2020/0272543 A1 | 8/2020 | Nallathambi et al. | |
| 2022/0201008 A1 * | 6/2022 | Stergioudis | G06N 3/045 |
| 2022/0237071 A1 * | 7/2022 | Wong | G06F 11/0793 |

OTHER PUBLICATIONS

EMC2, "SmartQuotas," EMC2, retrieved from https://mydocuments.emc.com/pub/en-us/isilon/onefs/7.2.1/ifs-pub-administration-guide-cli/21-ifs-br-smartquotas.htm on Aug. 18, 2021, 72 pages.
(Continued)

*Primary Examiner* — Theodore C Parsons
(74) *Attorney, Agent, or Firm* — Zilka-Kotab, P.C.

(57) ABSTRACT

A computer-implemented method, according to one approach, includes: monitoring actions of a user having access to a cluster, and in response to determining that the user has performed a risk event, incrementing a risk score assigned to the user. A determination is also made as to whether the incremented risk score is outside a predetermined range, and in response to determining that the incremented risk score is outside the predetermined range, a snapshot quota assigned to the user is dynamically reduced.

25 Claims, 11 Drawing Sheets

(56) References Cited

OTHER PUBLICATIONS

Oracle, "Setting ZFS Quotas and Reservations," Oracle, 2019, 1 page, retrieved from https://docs.oracle.com/cd/E53394_01/html/E54801/gazvb.html on Aug. 18, 2021.

IBM, "Filesets," IBM Spectrum Scale, 2019, 7 pages, retrieved from https://www.ibm.com/docs/en/spectrum-scale/5.0.3?topic=STXKQY_5.0.3/com.ibm.spectrum.scale.v5r03.doc/bl1hlp_filesfilesets.htm.

IBM, "IBM Qradar User Behavior Analytics," IBM, 2021, 10 pages, retrieved from https://www.ibm.com/in-en/products/qradar-user-behavior-analytics.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Kubernetes, "Pods," Kubernetes, 2021, 5 pages, retrieved from https://kubernetes.io/docs/concepts/workloads/pods/.

Kubernetes, "Controlling Access to the Kubernetes API," Kubernetes, 2021, 4 pages, retrieved from https://kubernetes.io/docs/concepts/security/controlling-access/.

* cited by examiner

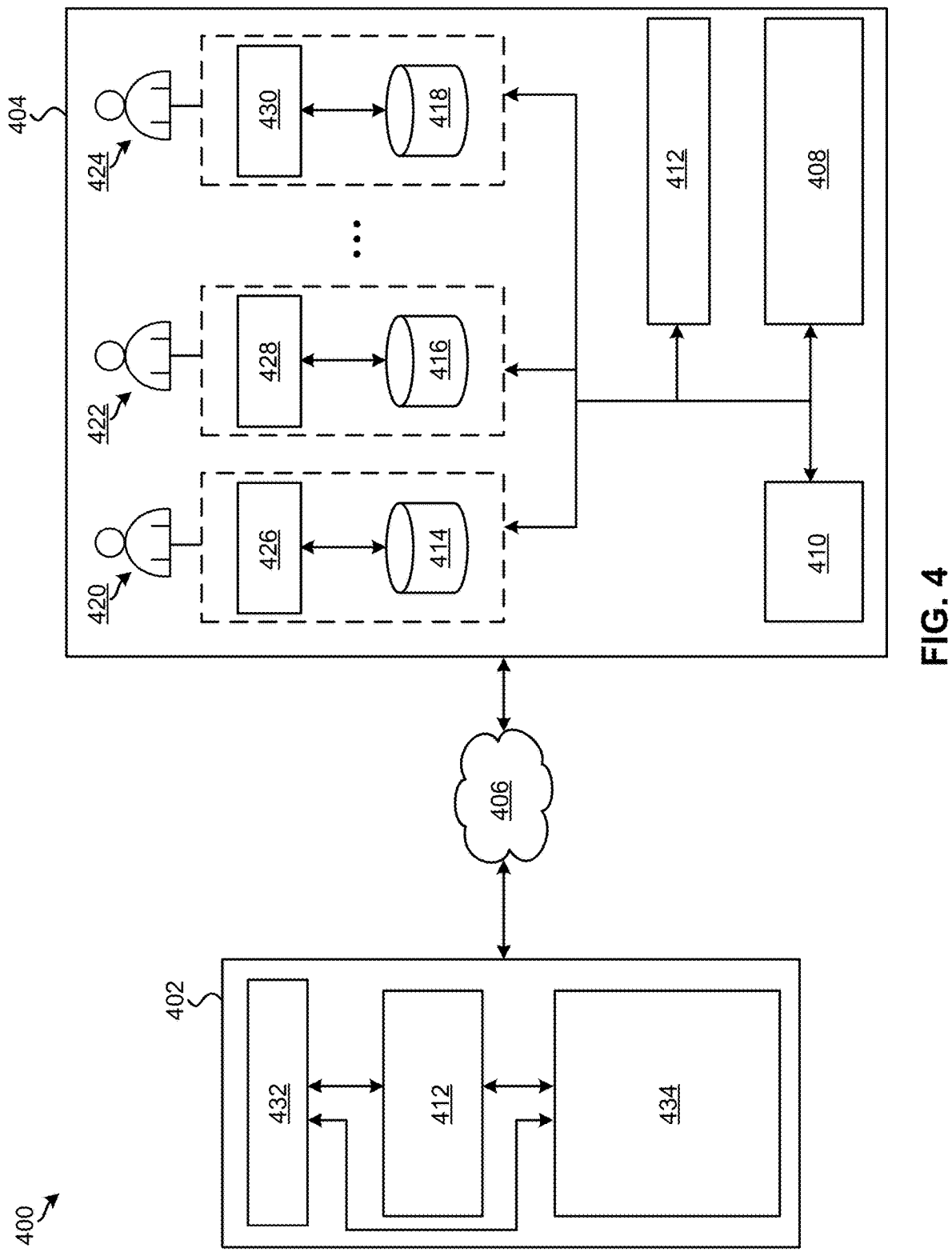

| User Details | PODs Owned | Volumes Owned | Mapping of Volumes to Storage Filesets/Files | User Risk Score |
|---|---|---|---|---|
| UID : 100 GID : 100 | POD1 | VOL1 | /mnt/fs/fileset1 | 6 |
| ... | ... | ... | ... | ... |

FIG. 6A

| File/ Fileset Name | Current Number of Snapshots | Snapshot Quota | Last Snapshot Timestamp | Minimum Interval Between Snapshots | User ID |
|---|---|---|---|---|---|
| /fs1/fileset1 | 3 | 5 | 10:00am IST | 12 hrs | 1001 |
| /fs1/fileset1 | 5 | 10 | | 1 hr | All Users |
| ... | ... | ... | ... | ... | ... |

FIG. 6B

DYNAMICALLY THROTTLING SNAPSHOT CAPTURE RATES

BACKGROUND

The present invention relates to data storage systems, and more specifically, this invention relates to dynamically throttling snapshot capture rates at the individual user level.

A clustered filesystem is a filesystem which is shared by being simultaneously mounted on multiple servers. Moreover, active file management (AFM) is a scalable, file system caching layer which is implemented in some clustered file systems. AFM allows users to create associations between a local cluster and a remote cluster, as well as define the location and flow of file data therebetween to automate the management of the data. It follows that clustered filesystems are somewhat insulated from experiencing data loss following disaster situations in which one of the multiple servers fail, and are therefore often utilized for data retention purposes.

Snapshots involve a storage technology that creates a read only copy of data at a point in time that a snapshot was taken and often use copy-on-write technology. It is a data protection technology used to create a consistent read only copy of data which may be used for backup as well as saving the state of data at a given point of time.

For example, snapshot-based asynchronous disaster recovery architectures include a primary site and a secondary site. An initial snapshot taken at the primary site is passed to the secondary site, after which incremental snapshots of the primary site are transferred to the secondary site. The primary site often functions as a read-writeable fileset which is able to host applications that are given read/write access to the data stored therein. It follows that the data stored in the primary site is asynchronously replicated to the secondary site. Moreover, a recovery point objective (RPO) setting allows for the frequency at which the incremental snapshots are taken to be specified.

While snapshots are useful in many applications, they have conventionally introduced adverse impacts on systems such as degrading performance of data storage. Moreover, data storages have limits on the number of snapshots that can be maintained at a time, and when these limits are reached, older snapshots are deleted to make room for new ones. While this allows for new snapshots to be created and stored, the process of deleting older snapshots again has a negative impact on performance of these conventional data storage systems as a whole.

Furthermore, snapshots can be used in a malicious manner in many instances to destabilize an overall system and/or an application hosted on storage, thereby resulting in a Denial of Service (DOS) like attack. For example, multiple snapshots can be created in short period of time, a series of snapshots can be deleted, etc. The same issues are experienced in conventional implementations involving cloning of volumes.

SUMMARY

A computer-implemented method, according to one approach, includes: monitoring actions of a user having access to a cluster, and in response to determining that the user has performed a risk event, incrementing a risk score assigned to the user. A determination is also made as to whether the incremented risk score is outside a predetermined range, and in response to determining that the incremented risk score is outside the predetermined range, a snapshot quota assigned to the user is dynamically reduced.

The snapshot quota limits a number of snapshots that may be formed in response to requests received from the user in a given amount of time. Additionally, each user having access to the cluster preferably has a unique snapshot quota assigned thereto. By dynamically allocating snapshot action limits per time period for each user based on the user's changing risk score, the security of the cluster itself is increased as well as the data therein. This also helps ensure the cluster is able to operate efficiently. These achievements are particularly desirable in comparison to the shortcomings experienced by conventional implementations which are at much higher risk of being attacked and suffering from resulting inoperability.

The unique snapshot quota assigned to a given one of the users having access to the cluster also limits: a number of snapshots the given one of the users is permitted to form for each fileset in the cluster in a first amount of time, as well as a number of clones the given one of the users is permitted to form of each file in the cluster in the first amount of time. This desirably expands the application of the unique snapshot quota to different types of filesystems.

It follows that in response to receiving a snapshot creation request from a user, the snapshot quota assigned to the user is preferably used to determine whether the snapshot creation request should be satisfied. As noted above, this desirably increases the security of the cluster itself as well as the data therein.

Moreover, the operations of the computer-implemented method are performed by a threat management module that is configured to communicate with the cluster. The threat management module is thereby able to monitor the cluster and even identify heightened security threats. For instance, in preferred approaches the threat management module is able to utilize the processed telemetry data to maintain a dynamic risk score for each of the users, e.g., as mentioned above.

A computer program product, according to another approach, includes one or more computer readable storage media having program instructions embodied therewith. The program instructions readable and/or executable by a processor to cause the processor to: perform the foregoing method.

A system, according to yet another approach, includes: a processor, and logic integrated with the processor, executable by the processor, or integrated with and executable by the processor. Moreover, the logic is configured to: perform the foregoing method.

Other aspects, approaches, and embodiments of the present invention will become apparent from the following detailed description, which, when taken in conjunction with the drawings, illustrate by way of example the principles of the invention.

BRIEF DESCRIPTION OF THE DRAWINGS

FIG. 4 is a partial representative view of a distributed data storage system in accordance with one approach.

FIG. 6A is a representational view of a lookup table in accordance with an in-use example.

FIG. 6B is a representational view of a lookup table in accordance with an in-use example.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products which are able to dynamically allocate (e.g., throttle) snapshot action limits per defined time period for each user based on the user's changing risk score. This increases the security of the cluster itself as well as the data therein, while also ensuring the cluster is able to operate efficiently. These achievements are particularly desirable in comparison to the shortcomings experienced by conventional implementations which are at much higher risk of being attacked and suffering from resulting inoperability, e.g., as will be described in further detail below.

In one general approach, a computer-implemented method includes: monitoring actions of a user having access to a cluster, and in response to determining that the user has performed a risk event, incrementing a risk score assigned to the user. A determination is also made as to whether the incremented risk score is outside a predetermined range, and in response to determining that the incremented risk score is outside the predetermined range, a snapshot quota assigned to the user is dynamically reduced.

In another general approach, a computer program product includes one or more computer readable storage media having program instructions embodied therewith. The program instructions readable and/or executable by a processor to cause the processor to: perform the foregoing method.

In yet another general approach, a system includes: a processor, and logic integrated with the processor, executable by the processor, or integrated with and executable by the processor. Moreover, the logic is configured to: perform the foregoing method.

Figure 1:
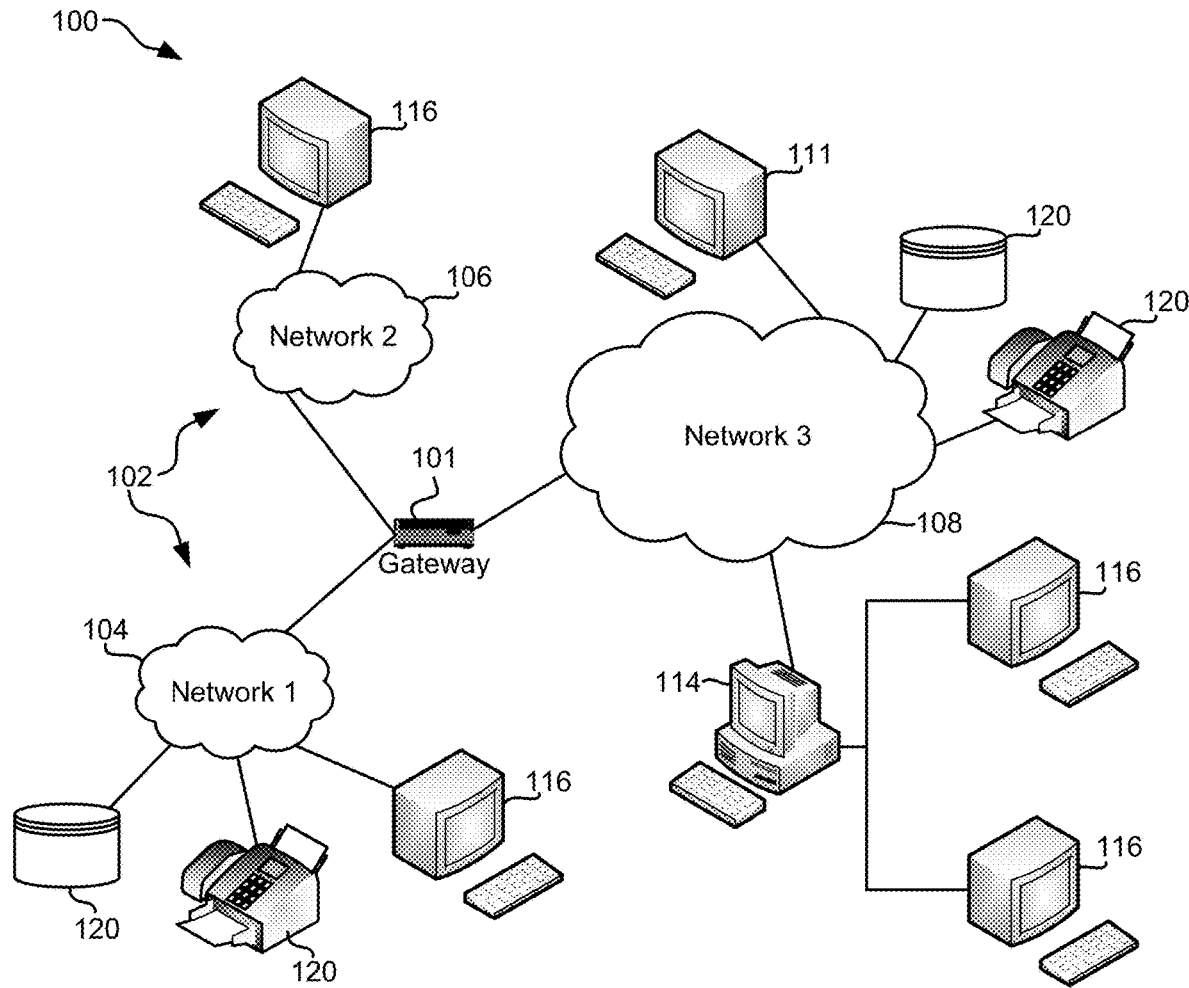
FIG. 1 is a diagram of a network architecture, in accordance with one approach.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM—based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
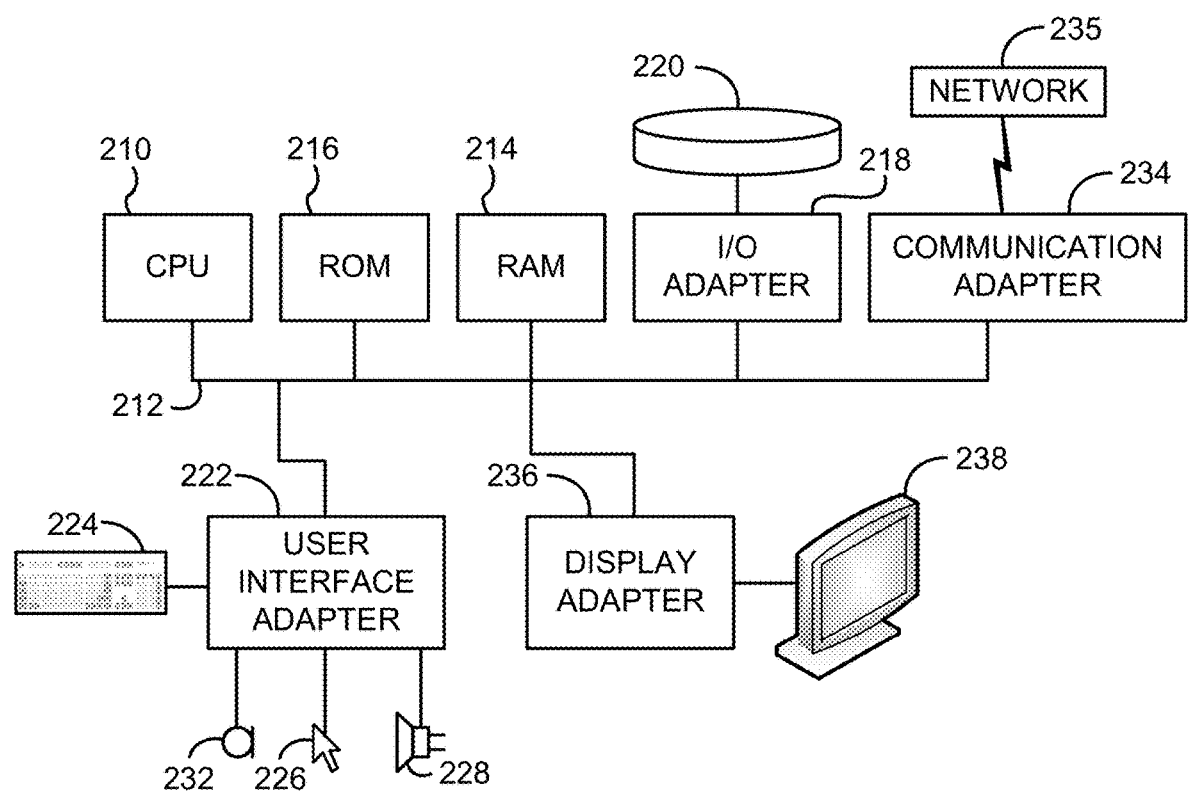
FIG. 2 is a diagram of a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

Figure 3:
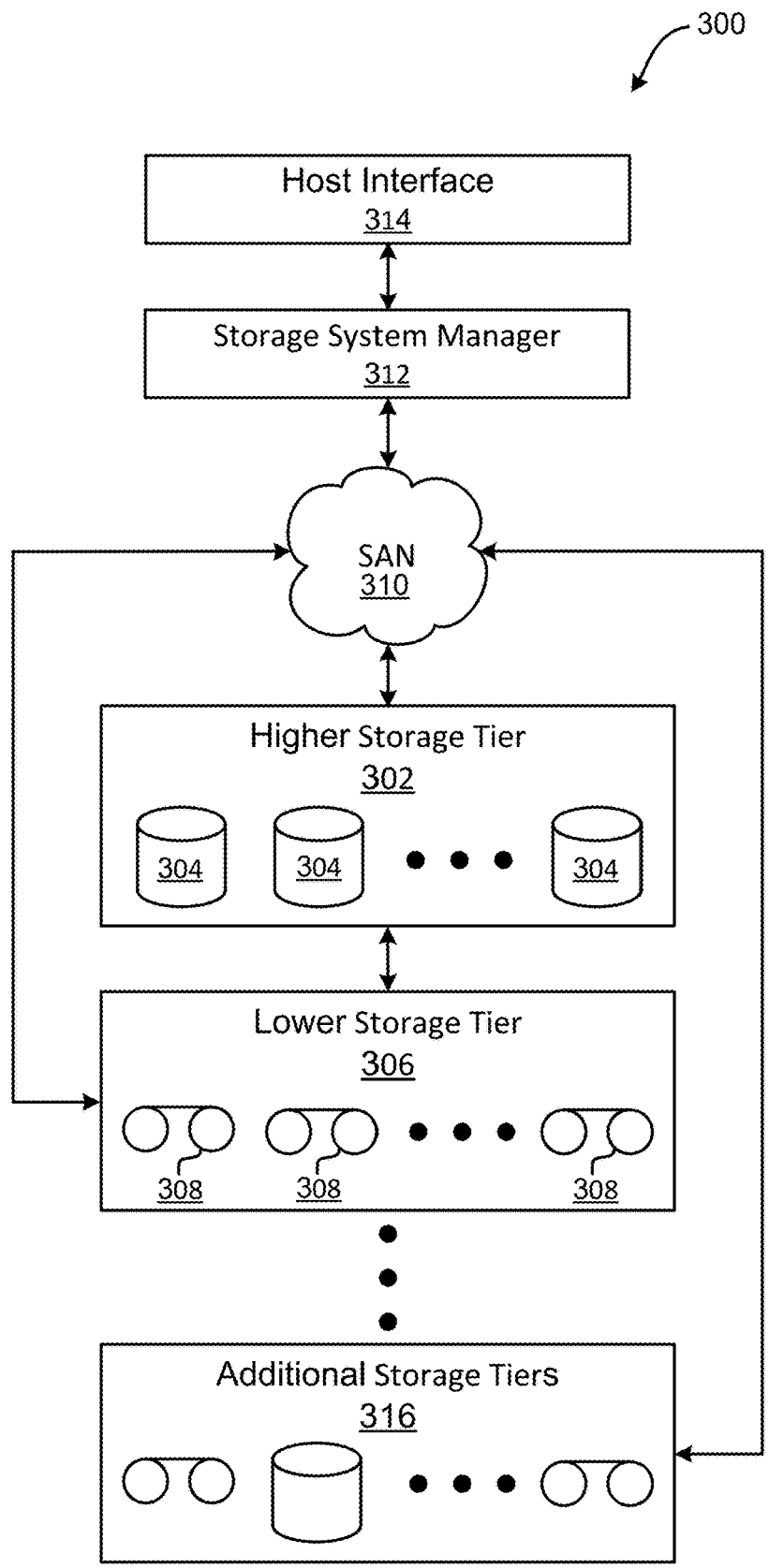
FIG. 3 is a diagram of a tiered data storage system, in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

Successfully performing a backup of a large data set typically takes a substantial amount of time to complete. However, on multi-tasking or multi-user systems, data operations may continue to be received and/or performed on data while it is being backed up. This prevents backup operations from being atomic and introduces a version skew that may result in data corruption. For example, if a user moves a file into a directory that has already been backed up, then that file would not be present on the backup media, as the backup operation had already taken place before the addition of the file. Version skew may also cause corruption with files which undesirably change their size or contents underfoot while being read.

An alternative option to safely back up live data is to temporarily disable write access to data during the backup procedure, either by stopping any accessing applications, or by using a locking application programming interface (API) provided by the operating system to enforce exclusive read access. While this option is tolerable for low-availability systems, e.g., such as desktop computers and small workgroup servers on which regular downtime is acceptable, high availability systems cannot tolerate service stoppages.

To avoid downtime, high availability systems may instead perform the backup using a snapshot which represents a read-only copy of the data set as it existed at a given point in time, while allowing applications to continue modifying the data. For instance, as mentioned above, snapshot-based asynchronous disaster recovery architectures are utilized in order to avoid data loss in disaster situations. This has been implemented by taking an initial snapshot at a primary site, which is then passed to a removed secondary site. After the initial snapshot, incremental snapshots of the primary site are transferred to the secondary site. The primary site often functions as a read-writeable fileset which is able to host applications that are given read/write access to the data stored therein.

Again, while snapshots are useful in many applications, they have introduced adverse impacts on conventional systems such as degrading performance of data storage. Moreover, data storages have limits on the number of snapshots that can be maintained at a time, and when these limits are reached, older snapshots are deleted to make room for new ones. While this allows for new snapshots to be created and stored, the process of deleting older snapshots again has a negative impact on performance of these conventional data storage systems as a whole.

Furthermore, snapshots can be used in a malicious manner in many instances to destabilize an overall system and/or an application hosted on storage, thereby resulting in a Denial of Service (DOS) like attack. For example, multiple snapshots can be created in short period of time, a series of snapshots can be deleted, etc. The same issues are experienced in conventional implementations involving cloning of volumes (in cases where a file presents a volume and cloning of volume results in file cloning. File cloning makes use of the same technology as that of snapshot (copy-on-write) and malicious use of file cloning can result into instability of the system.

In sharp contrast to the foregoing shortcomings experienced by previous implementations, various ones of the approaches included herein are able to dynamically throttle snapshot capture rates at the user level. Accordingly, some of the approaches herein are able to prevent degradation to storage system performance by adjusting the functionality that each user is permitted to have in real-time, e.g., as will be described in further detail below.

Looking now to FIG. 4, a distributed data storage system 400 is illustrated in accordance with one embodiment. As an option, the present data storage system 400 may be implemented in conjunction with features from any other embodiment and/or approach listed herein, such as those described with reference to the other FIGS. However, such data storage system 400 and others presented herein may be used in various applications and/or in permutations which may or may not be specifically described in the illustrative approaches listed herein. Further, the data storage system 400 presented herein may be used in any desired environment. Thus FIG. 4 (and the other FIGS.) may be deemed to include any possible permutation.

As shown, the data storage system 400 includes a server 402 and a cluster 404 which are connected by a network 406. In some approaches, the cluster 404 includes data storage components (e.g., types of memory) which are capable of achieving different data performance levels. In other words, the cluster 404 may include a multi-tier data storage system which includes a lower performance storage tier and a higher performance storage tier (e.g., as seen in FIG. 3 above). With respect to the present description, a lower performance storage tier has a lower level of performance (e.g., a lower achievable throughput, slower data access rates, higher write delays, etc.) at least with respect to that of the higher performance storage tier. According to an example, which is in no way intended to limit the invention, the higher performance storage tier includes SSDs while the lower performance storage tier includes HDDs.

Moreover, a controller (e.g., processor) 412 is included at both the server 402 location as well as the cluster 404. The controllers 412 may also be able to communicate with each other (e.g., send data, commands, requests, etc. to each other) using a connection to network 406, e.g., as would be appreciated by one skilled in the art after reading the present description.

The network 406 connecting the server 402 to the cluster 404 may be a WAN according to some approaches. However, the network 406 may include any desired type of network, e.g., such as a LAN, a SAN, a personal area network (PAN), etc., e.g., depending on the approach. For instance, the type of network 406 used to connect the server 402 to the cluster 404 may depend on the distance separating the storage locations. It follows that in some approaches, the server 402 and the cluster 404 may be geographically separated by any amount of physical distance.

As described above, snapshot-based asynchronous disaster recovery architectures implement a source location (also referred to herein as a "primary storage location") and a target location (also referred to herein as a "secondary storage location"), the two sites being able to transfer data therebetween. For instance, snapshots are incrementally taken at the source location and then passed (e.g., asynchronously replicated) to the removed target location for redundant storage. A storage snapshot is a set of reference markers for data at a particular point in time in some approaches. In other words, a snapshot serves as a detailed table of contents, providing accessible copies of data which may be accessed as desired. Accordingly, although FIG. 4 does not depict the cluster 404 being coupled to another cluster and/or data storage system, the distributed data storage system 400 may include additional storage locations coupled to the locations depicted in the present approach. The cluster 404 may thereby send data, requests, responses, commands, etc., to any desired location that is coupled thereto either directly or through the network 406.

Looking specifically now to the cluster 404, the controller 412 (e.g., processor) is coupled to a data storage location 408 as well as a directory 410. In some approaches the data storage location 408 may include file storage such that data is stored in the form of files and/or filesets, while in other approaches the data storage location 408 may include block storage such that data is stored in the form of volumes. In some approaches, the data storage location 408 may even include combinations of file storage and block storage.

Moreover, the directory 410 is used to map various disks 414, 416, 418 to the users 420, 422, 424. The users 420, 422, 424 may be identified from each other by a user identification (ID) that is assigned to each of them, and which may be stored in the directory 410, e.g., in a lookup table. In preferred approaches each of the disks 414, 416, 418 are mapped to a respective one of the users 420, 422, 424, but the mapping may be configured any desired way. For instance, in other approaches more than one disk may be mapped to each user.

This mapping of the various disks 414, 416, 418 is achieved, at least in part, by assigning a different container 426, 428, 430 to each of the respective users 420, 422, 424. The containers 426, 428, 430 are also each assigned a corresponding one of the various disks 414, 416, 418, thereby correlating each of the disks 414, 416, 418 with a different one of the users 420, 422, 424. It follows that in the present approach, the cluster 404 permits one or more users to have access to data that is stored in the data storage location 408. It should also be noted that the use of the term "disk" is in no way intended to be limiting. For instance, while the portion of memory is called a disk in approaches implementing file systems, other approaches may implement block storage whereby the portion of memory assigned to each of the users 420, 422, 424 may be a volume, e.g., as would be appreciated by one skilled in the art after reading the present description.

Looking now to the server 402, the controller 412 is coupled to a threat management module 432 as well as memory 434. The threat management module 432 receives telemetry data from the cluster 404 over the network 406 and processes the telemetry data to gain an accurate understanding of the actions being performed at the cluster 404. The threat management module 432 is thereby able to monitor the cluster 404 and even identify heightened security threats. For instance, in preferred approaches the threat management module 432 is able to utilize the processed telemetry data to maintain a dynamic risk score for each of the users 420, 422, 424. These risk scores may be used to ultimately determine if and how the corresponding one of the users 420, 422, 424 is able to access data. For instance, a user's risk score may determine a number of snapshots they are permitted to form in a given amount of time e.g., as described below with respect to method 500.

Figure 5A:
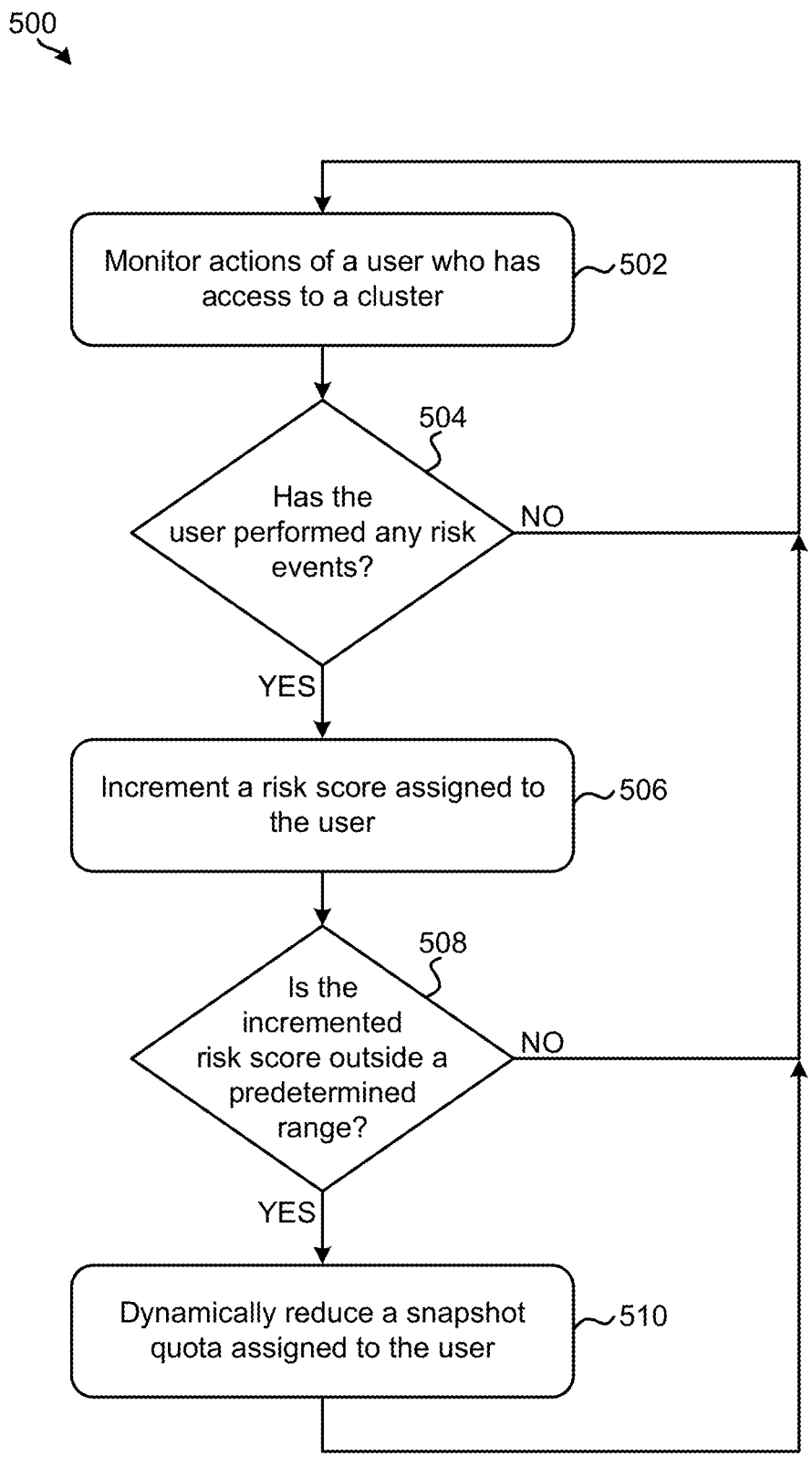
FIG. 5A is a flowchart of a method in accordance with one approach.

Referring now to FIG. 5A, a flowchart of a method 500 for dynamically throttling the snapshot rates of various users is shown according to one embodiment. The method 500 may be performed in accordance with the present approach in any of the environments depicted in FIGS. 1-4, among others, in various approaches. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various approaches, the method 500 may be partially or entirely performed by a controller (e.g., see 412 in server 402 of FIG. 4), a processor, a computer, etc., or some other device having one or more processors therein. Thus, in some approaches, method 500 may be a computer-implemented method. Moreover, the terms computer, processor and controller may be used interchangeably with regards to any of the approaches herein, such components being considered equivalents in the many various permutations of the present approach.

Moreover, for those approaches having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, operation 502 of method 500 includes monitoring actions of a user who has access to a cluster. In other words, operation 502 includes monitoring data operations, requests, access attempts, etc. that are initiated at a cluster by a user with access thereto. It should be noted that the use of the term "user" herein is in no way intended to be limiting. For instance, while in some approaches a user may be a person, in other approaches a user may actually be a running application, another controller issuing data requests, etc. However, it is preferred that the user can be identified uniquely via an identifier which may be defined in a directory (e.g., such as an active directory and/or a Lightweight Directory Access Protocol), as would be appreciated by one skilled in the art after reading the present description.

The type of operations, requests, access attempts, etc., that are issued by the user may also vary. For instance, depending on the approach, write requests, read requests, deletion requests, merge requests, etc. may be issued by the user for implementation. Moreover, while various ones of the processes included in method 500 are described in the context of a single user, this is in no way intended to be limiting either. For instance, in some approaches method 500 may be performed (e.g., repeated) for each user who has access to the cluster, while in other approaches method 500 may simultaneously monitor all users having access to the cluster and react to their actions accordingly, e.g., as will soon become apparent.

As noted above, the actions of a user having access to a cluster may vary depending on a number of factors. For instance, while previous systems have limited storage snapshot capabilities to storage administrators, this functionality has been extended to entities such as users. Thus, in some approaches a user may be interested in forming (e.g., capturing) snapshots of the data that is stored in the cluster.

According to an example, which is in no way intended to limit the invention, Kubernetes clusters, storage features like volume creation and volume snapshot capabilities (e.g., including storage snapshots) are available to developers running (e.g., owning) a container (e.g., POD) at the cluster. It follows that in some clusters, there can be thousands of containers that are owned by unique users (e.g., developer users), where snapshot creations translate down to the common storage hosting. According to another example, which is again in no way intended to limit the invention, cloud hosted orchestration platforms control access to snapshot operations using identity and access management (IAM), and instances assigned an IAM profile are able to perform snapshot operations. It follows that the attack surface for various implementations has been increased significantly, thereby increasing the risk of nefarious attacks on the cluster, e.g., by creating unnecessary and/or deleting important storage snapshots.

Thus, by monitoring actions of a user who has access to a cluster, method 500 is desirably able to maintain a risk score for the user which represents the relative risk the user poses to the security and operability of the cluster. As previously mentioned, the actions of a user at the cluster may actually be monitored by receiving telemetry data from the cluster and processing it. Moreover, the telemetry data may be processed using a threat management module (e.g., see 432 of FIG. 4) which is thereby able to monitor the cluster and even identify heightened security threats by maintaining a dynamic risk score for each user. For instance, the threat management module may implement threat management and/or security information and event management (SIEM) software which would be apparent to one skilled in the art after reading the present description. According to an example, which is in no way intended to limit the invention, the threat management module may implement QRadar, Cloud Pak for Security, etc. The threat management module may further implement any desired type of user behavior analytics which assists in the process of dynamically determining and updating a user's risk score.

It follows that these risk scores may be used to ultimately determine if and how the corresponding one of the users is able to access the cluster. For instance, a user's risk score may determine a number of snapshots they are permitted to form in a given amount of time. In some situations, a risk score determined and assigned to a given user may also be assigned to other users determined as corresponding to the given user. For instance, two different users identified as having an operational relationship may have the same risk score and/or snapshot quota assigned thereto. In some approaches, two different user IDs determined as corresponding to a same individual, application, etc., may be identified as having an operational relationship that warrants assigning the same risk score and/or snapshot quota to the two different user IDs.

The actions of the user may thereby be combined (e.g., summed) and used to effectively dictate what functionality the user is permitted to have in the cluster. Various types of actions the user may perform thereby affect the relative risk score assigned to the user differently. For instance, some types of actions may be deemed as being not risky (e.g., safe), while other types of actions are deemed as being risk events (e.g., risky).

According to an example, which is in no way intended to limit the invention, operations including, but not limited to, data write operations, data read operations, data transfer requests, etc., may be deemed as being not risky when performed or at least requested by a user. However, actions attempted by a user including, but not limited to, violating one or more security policies, accessing data the user does not have access to, tailgating, etc., may be identified as being risky or "risk events". It follows that by monitoring the actions a user having access to a cluster attempts, actions deemed as being risky may be identified and used to actually adjust a risk score (e.g., risk profile) that is assigned to the user.

Accordingly, decision 504 includes determining whether any of the actions performed by (or at least requested by) the user having access to the cluster are considered risk events. As noted above, this may be performed by actually processing telemetry data received from the cluster. In response to determining that none of the actions performed by the user having access to the cluster are considered risk events, the flowchart returns to operation 502, e.g., such that the actions of users may continue to be monitored. It follows that processes 502, 504 may be repeated any desired number of times (e.g., in an iterative fashion) to ensure the actions of any user with access to the cluster are monitored and any risk events are identified.

However, in response to determining that at least one of the actions performed by the user having access to the cluster is considered a risk event, method 500 proceeds to operation 506. There, operation 506 includes incrementing a risk score assigned to the user. As noted above, by maintaining a risk score (e.g., a risk profile) of each user with access to the cluster, method 500 is able to identify risk events and even increase the security of the cluster by maintaining an accurate understanding of all the actions being performed at the cluster.

In some approaches, the risk score may simply be a counter that can be incremented by a predetermined amount. In other approaches, the risk score may be quantified by a mathematical relationship which assigns a weighted value to each different type of risk event. The risk scores may further be stored in memory (e.g., see 434 of FIG. 4), in a lookup table, in a header assigned to each of the respective users, using metadata, etc.

With continued reference to FIG. 5A, decision 508 further includes determining whether the incremented risk score is outside a predetermined range. In other words, decision 508 includes determining whether the user corresponding to the risk score is considered as being undesirably risky based on current and/or past actions. The threshold may be predetermined by a cluster administrator, based on industry standards, risk tolerances of the cluster, the type of data stored in the cluster, etc. It should also be noted that "outside a predetermined range" is in no way intended to limit the invention. Rather than determining whether a value is outside a predetermined range, equivalent determinations may be made, e.g., as to whether a value is within a predetermined range, whether a value is above a threshold, whether an absolute value is above a threshold, whether a value is below a threshold, etc., depending on the desired approach.

In response to determining that the incremented risk score is not outside the predetermined range, method 500 again returns to operation 502, e.g., such that the actions of users may continue to be monitored. It follows that processes 502, 504, 506, 508 may be repeated any desired number of times (e.g., in an iterative fashion) to ensure the actions of any user with access to the cluster are monitored and any risk events are identified. However, in response to determining that the incremented risk score is outside the predetermined range, method 500 proceeds to operation 510. There, operation 510 includes dynamically reducing a snapshot quota assigned to the user. As noted above, the ability to create snapshots has been extended to entities such as users, thereby increasing the attack surface for various implementations as well as the risk of nefarious attacks on the cluster, e.g., by creating unnecessary and/or deleting important storage snapshots.

The snapshot quota may thereby be used to effectively reduce the likelihood of an attack occurring in the first place by limiting a number of snapshots a user is permitted to form in a given amount of time (e.g., over a given period). In other words, the snapshot quota effectively dictates (e.g., sets) a maximum number of snapshots that may be formed in response to requests received from a corresponding user in a given amount of time. For instance, in some approaches the snapshot quota may limit the number of snapshots the user is permitted to request and form for each fileset in a cluster in a first amount of time. In other approaches, the snapshot quota may limit the number of clones the user is permitted to request and form of each file in a cluster in a second amount of time.

Moreover, snapshot quotas may be assigned to each user such that the number of snapshots, clones, etc. a user is permitted to create over a given amount of time is tunable on an individual basis. In other words, each user having access to a cluster preferably has a unique (e.g., distinct) snapshot quota assigned thereto. Moreover, the unique snapshot assigned to a given one of the users having access to the cluster may limit a number of snapshots the given one of the users is permitted to form for each fileset in the cluster in a first amount of time, and/or a number of clones the given one of the users is permitted to form of each file in the cluster in the first amount of time, e.g., as will be described in further detail below.

Snapshot quotas are also updated dynamically as the risk scores for the corresponding users are updated over time. With respect to the present description, it should also be noted that the "first amount of time" and the "second amount of time" may be the same, similar, or different amounts of time depending on the particular approach. For instance, the type of user action being limited may have an effect on the amount of time the snapshot quota is applied for. The first and/or second amounts of time may further be predetermined by a cluster administrator, a running application, a remote threat management module (e.g., see 432 of FIG. 4), etc.

Figure 5B:
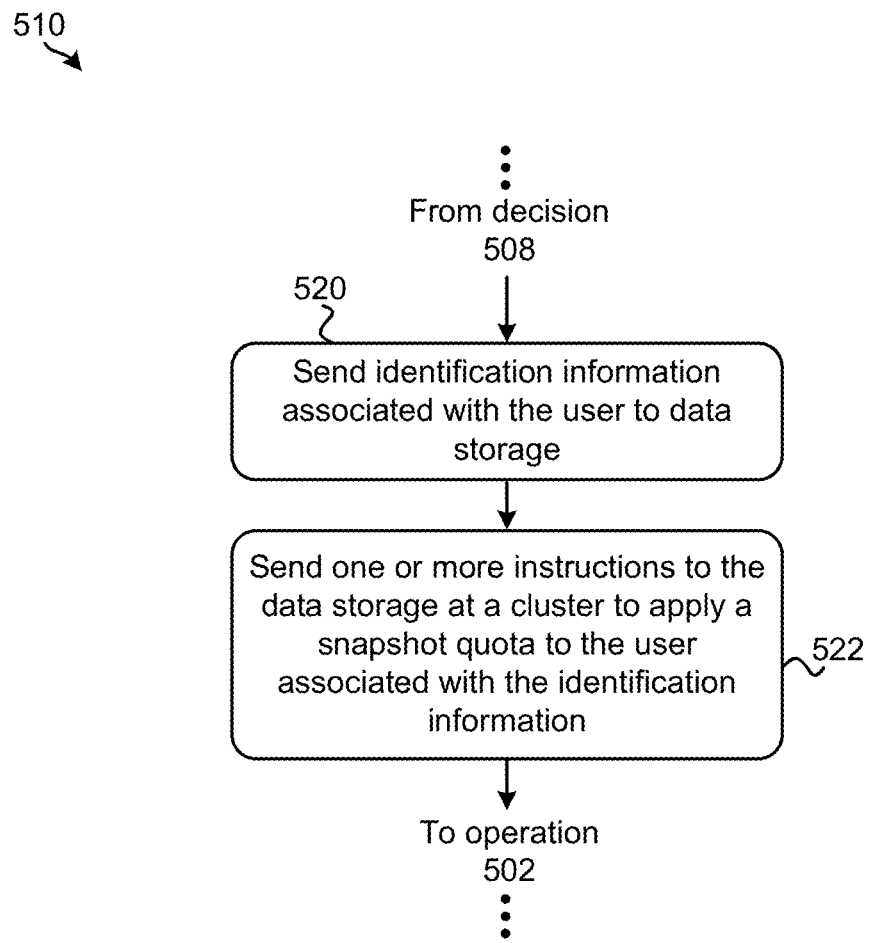
FIG. 5B is a flowchart of sub-processes for one of the operations in the method of FIG. 5A, in accordance with one approach.

Referring momentarily now to FIG. 5B, exemplary sub-processes of dynamically reducing a snapshot quota assigned to a user are illustrated in accordance with one approach, one or more of which may be used to perform operation 510 of FIG. 5A. However, it should be noted that the sub-processes of FIG. 5B are illustrated in accordance with one approach which is in no way intended to limit the invention.

As shown, FIG. 5B includes sending identification information associated with the user to data storage. See sub-operation 520. The users having access to a cluster may be distinguished from each other by a unique user ID that is assigned to each of the respective users. The user IDs may be stored in metadata, written in headers assigned to the users, stored in a lookup table, maintained in a directory (e.g., see 410 of FIG. 4), etc. depending on the particular approach. The identification information associated with the user may thereby be accessed (e.g., from memory) before being transferred to the data storage at a cluster. According to some approaches, the identification information may actually be sent to a directory at the cluster which is able to implement the corresponding snapshot quota.

From sub-operation 520, the flowchart proceeds to sub-operation 522 which includes sending one or more instructions to the data storage at a cluster to apply a snapshot quota to the user associated with the identification information. In some approaches, the one or more instructions may simply indicate that snapshot quotas should be referenced each time the user submits an instruction, request, command, etc., involving a snapshot. In other approaches, the one or more instructions may indicate that the snapshot quotas should be referenced each time the user performs or attempts to perform an action that is deemed to be a risk event (e.g., see method 550 of FIG. 4D below).

It follows that actions considered as being "risk events" may vary depending on the particular implementation. For instance, a certain system may be vulnerable to specific types of attacks, include sensitive data, be configured in a specific way, etc., thereby causing certain types of actions to be considered "risky" or "threatening" to the security and operability of the particular system. Thus, the risk events may be established (e.g., defined) by a system administrator, a network architect, based on industry standards, data security standards, etc. According to some approaches, actions attempted by a user including, but not limited to, violating one or more security policies, accessing data the user does not have access to, tailgating, etc., may be identified as being risky or "risk events". It follows that by monitoring the actions a user having access to a cluster attempts, those actions deemed as being risky may be identified and used to actually adjust a risk score (e.g., risk profile) that is assigned to the user.

As noted above, the user IDs may be maintained in a directory (e.g., see 410 of FIG. 4) in some approaches. Accordingly, the one or more instructions sent in sub-operation 522 may be sent to the directory in such approaches. In other approaches the one or more instructions may be sent to a central controller (e.g., see 412 of FIG. 4), a data storage location itself (e.g., see 408 of FIG. 4), etc. It should be noted that in still other approaches, a snapshot quota assigned to a user may be dynamically reduced by accessing a resource quota policy engine which can in turn throttle or not allow an identified user to create more than a predetermined number of snapshots for each volume in a given time interval.

Returning now to FIG. 5A, the actions of the various users having access to the cluster are preferably continually monitored such that the risk scores and snapshot quotas corresponding to the respective users are dynamically updated over time. It follows that the various processes included in method 500 may be repeated any desired number of times. In some approaches, the various processes included in method 500 may be repeated in an iterative fashion as long as one or more users have access to the cluster. As a result, method 500 is desirably able to dynamically allocate (e.g., throttle) snapshot action limits per defined time period for each user based on the user's changing risk score. This increases the security of the cluster itself as well as the data therein, while also ensuring the cluster is able to operate efficiently. These achievements are particularly desirable in comparison to the shortcomings experienced by conventional implementations which are at much higher risk of being attacked and suffering from resulting inoperability.

While the approaches described above deal with situations in which the risk score of a given user is incremented (e.g., increased) in response to identifying situations where the user at least attempts to perform a risk event, a risk score may be decremented in some situations. For instance, looking now to FIG. 5C, a flowchart of a method 530 for updating the respective risk scores of various users is shown according to one embodiment. The method 530 may be performed in accordance with the present approach in any of the environments depicted in FIGS. 1-5B, among others, in various approaches. Of course, more or less operations than those specifically described in FIG. 5C may be included in method 530, as would be understood by one of skill in the art upon reading the present descriptions.

Each of the steps of the method 530 may be performed by any suitable component of the operating environment. For example, in various approaches, the method 530 may be partially or entirely performed by a controller (e.g., see 412 in server 402 of FIG. 4), a processor, a computer, etc., or some other device having one or more processors therein. Thus, in some approaches, method 530 may be a computer-implemented method. Moreover, the terms computer, processor and controller may be used interchangeably with regards to any of the approaches herein, such components being considered equivalents in the many various permutations of the present approach. It follows that in some approaches one or more of the processes included in method 530 may be performed in the background, e.g., as to not impact performance of a corresponding cluster as would be appreciated by one skilled in the art after reading the present description.

Moreover, for those approaches having a processor, the processor, e.g., processing circuit(s), chip(s), and/or module(s) implemented in hardware and/or software, and preferably having at least one hardware component may be utilized in any device to perform one or more steps of the method 530. Illustrative processors include, but are not limited to, a central processing unit (CPU), an application specific integrated circuit (ASIC), a field programmable gate array (FPGA), etc., combinations thereof, or any other suitable computing device known in the art.

Figure 5C:
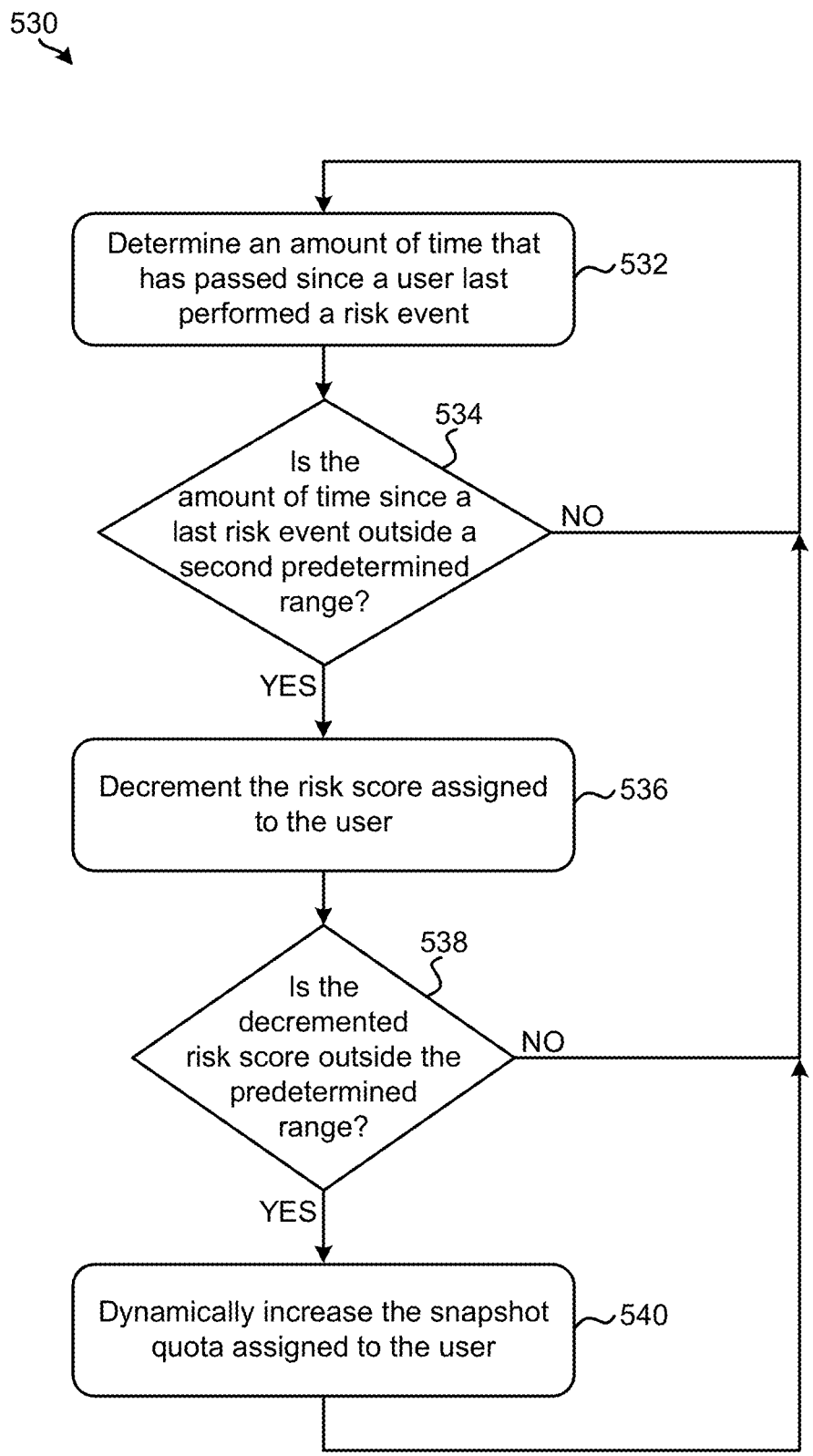
FIG. 5C is a flowchart of a method in accordance with one approach.

As shown in FIG. 5C, operation 532 of method 530 includes determining an amount of time that has passed since a user last performed a risk event. As noted above, telemetry data may be received and processed by a threat management module in order to determine the types of actions users having access to a cluster are attempting to perform. Thus, operation 532 may be performed in some approaches by evaluating the telemetry data and determining an amount of time since a last risk event was performed or at least attempted by a user.

Decision 534 further includes determining whether the amount of time that has passed since the user last performed a risk event is outside a second predetermined range. In other words, decision 534 determines whether a sufficient amount of time has passed since the corresponding user performed or at least attempted to perform a risk event. The second predetermined range may be set by an administrator, randomly assigned, based on past user performance, etc. It should also be noted that "outside a second predetermined range" is in no way intended to limit the invention. Rather than determining whether a value is outside a second predetermined range, equivalent determinations may be made, e.g., as to whether a value is within a predetermined range, whether a value is above a threshold, whether an absolute value is above a threshold, whether a value is below a threshold, etc., depending on the desired approach.

In response to determining that the amount of time that has passed since the user last performed a risk event is not outside a second predetermined range, method 530 returns to operation 532, e.g., such that the actions of users may continue to be monitored with respect to the passage of time. It follows that processes 532, 534 may be repeated any desired number of times (e.g., in an iterative fashion). However, in response to determining that the amount of time that has passed since the user last performed a risk event is outside the second predetermined range, method 530 proceeds to operation 536.

There, operation 536 includes decrementing the risk score assigned to the user. The risk score may be decremented using the same or similar approaches to those described above with respect to incrementing the risk score (e.g., see operation 506 of FIG. 5A). As noted above, by maintaining a risk score (e.g., a risk profile) of each user with access to the cluster, the approaches herein are able to identify risk events and even increase the security of the cluster by maintaining an accurate understanding of all the actions being performed at the cluster.

With continued reference to FIG. 5C, decision 538 further includes determining whether the decremented risk score is outside the predetermined range. In other words, decision 538 includes determining whether the user corresponding to the risk score is still considered as being undesirably risky based on current and/or past actions. As noted above, the threshold may be predetermined by a cluster administrator, based on industry standards, risk tolerances of the cluster, the type of data stored in the cluster, etc. In response to determining that the decremented risk score is still outside the predetermined range, method 530 returns to operation 532, e.g., such that the actions of users may continue to be monitored with respect to the passage of time as mentioned above.

However, method 530 proceeds to operation 540 in response to determining that the decremented risk score is no longer outside the predetermined range. There, operation 540 includes dynamically increasing the snapshot quota assigned to the user before returning to operation 532. While decrementing the snapshot quota assigned to a user is desirable in situations where the actions of the user indicate that the user is at a higher risk of attacking the cluster, snapshot quotas can also be increased in situations where a user has proven they are less of a risk to the cluster. It follows that when the risk score of a given user is decremented to the point that it is no longer outside a predetermined range, the user may be awarded additional functionality, e.g., by increasing the snapshot quota assigned to the user as described above. Method 530 may thereby be used to ensure the snapshot quotas are dynamically updated over time in view of the actions that are performed by the corresponding users. Moreover, by returning to operation 532 method 530 is able to continue monitoring the actions of users with respect to the passage of time.

As noted above, it is desirable that a snapshot quota corresponding to a given user be at least referenced in situations where the user is performing or at least attempting to perform a risk event. For instance, looking now to FIG. 5D, a flowchart of a method 550 for updating the respective risk scores of various users is shown according to one embodiment. The method 550 may be performed in accordance with the present approach in any of the environments depicted in FIGS. 1-5C, among others, in various approaches. Of course, more or less operations than those specifically described in FIG. 5D may be included in method 550, as would be understood by one of skill in the art upon reading the present descriptions.

Each of the steps of the method 550 may be performed by any suitable component of the operating environment. For example, in various approaches, the method 550 may be partially or entirely performed by a controller (e.g., see 412 in server 402 and/or in cluster 404 of FIG. 4), a threat management module (e.g., see 432 of FIG. 4), a processor, a computer, etc., or some other device having one or more processors therein. Thus, in some approaches, method 550 may be a computer-implemented method. Moreover, the terms computer, processor and controller may be used interchangeably with regards to any of the approaches herein, such components being considered equivalents in the many various permutations of the present approach. It follows that in some approaches one or more of the processes included in method 550 may be performed in the background, e.g., as to not impact performance of a corresponding cluster as would be appreciated by one skilled in the art after reading the present description.

Moreover, for those approaches having a processor, the processor, e.g., processing circuit(s), chip(s), and/or module(s) implemented in hardware and/or software, and preferably having at least one hardware component may be utilized in any device to perform one or more steps of the method 550. Illustrative processors include, but are not limited to, a central processing unit (CPU), an application specific integrated circuit (ASIC), a field programmable gate array (FPGA), etc., combinations thereof, or any other suitable computing device known in the art.

Figure 5D:
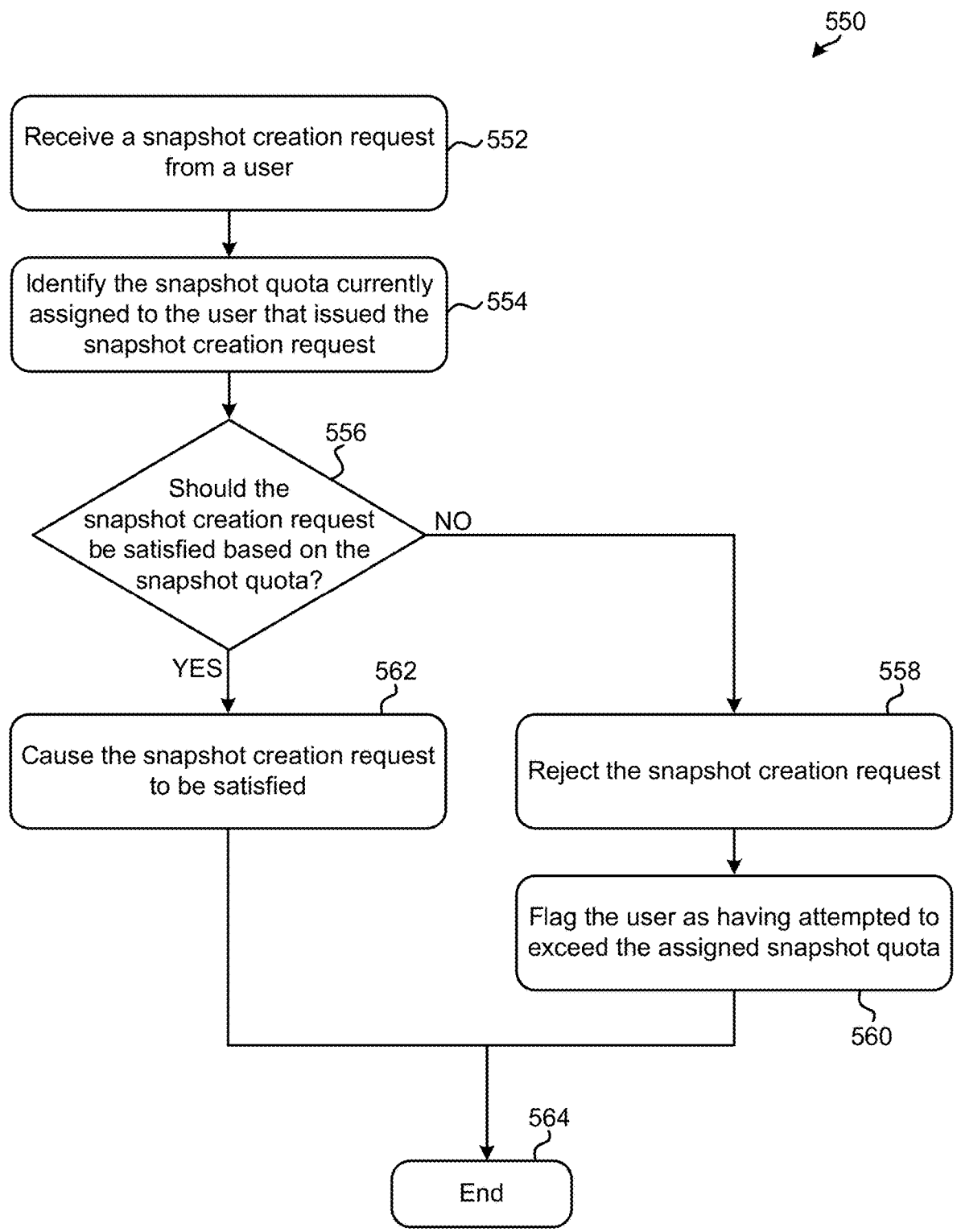
FIG. 5D is a flowchart of a method in accordance with one approach.

As shown in FIG. 5D, operation 552 of method 550 includes receiving a snapshot creation request from a user. The type of snapshot creation request that is received may vary depending on the approach. For instance, in some approaches the snapshot creation request may involve forming a snapshot of a fileset in a cluster, while in other approaches the snapshot create request may involve forming a clone of file.

Method 550 also includes identifying the snapshot quota currently assigned to the user that issued the snapshot creation request. See operation 554. The snapshot quota currently assigned to the user may be determined by using a unique user ID associated with the user that issued the snapshot creation request. For instance, in some approaches the user ID may be used to look up the snapshot quota that corresponds thereto, e.g., in a lookup table (e.g., see FIGS. 6A-6B below).

Furthermore, decision 556 includes determining whether the snapshot creation request should be satisfied based on the snapshot quota assigned to the user. In other words, decision 556 includes using the snapshot quota assigned to the user to determine whether the snapshot creation request should be satisfied. As noted above, the snapshot quota may be used to effectively reduce the likelihood of an attack occurring at a cluster by limiting a number of snapshots the user is permitted to form in a given amount of time (e.g., over a given period). Decision 556 may thereby include identifying a number of snapshots the user has formed in the given amount of time and determining whether it is less than the corresponding snapshot quota.

In response to determining that the snapshot creation request should not be satisfied based on the snapshot quota assigned to the user (e.g., that the user has already reached their snapshot quota for the given period of time), method 550 proceeds to operation 558. There, operation 558 includes rejecting the snapshot creation request. Moreover, operation 560 includes flagging the user as having attempted to exceed the assigned snapshot quota. In some approaches this attempt to exceed the assigned snapshot quota may be indicated in a lookup table, metadata, etc., such that in situations where a user attempts to exceed their assigned snapshot quota a certain number of times, the user's access to the cluster may be revoked or at least suspended. A warning may also be sent to an administrator indicating that a user's snapshot creation request was denied, e.g., such that additional steps and/or monitoring may be performed.

From operation 560, the flowchart of FIG. 5D proceeds to operation 564, whereby method 550 may end. However, it should be noted that although method 550 may end upon reaching operation 564, any one or more of the processes included in method 550 may be repeated in order to process additional snapshot creation requests. In other words, any one or more of the processes included in method 550 may be repeated for subsequently received snapshot related requests.

However, returning to decision 556, method 550 proceeds to operation 562 in response to determining that the snapshot creation request should be satisfied based on the snapshot quota assigned to the user (e.g., that the user has not yet reached their snapshot quota for the given period of time). There, operation 562 includes causing the snapshot creation request to be satisfied. The process of causing the snapshot creation request to be satisfied varies depending at least in part on where method 550 is being performed.

For instance, method 550 may be performed by a controller at a server that is in communication with the cluster having the data the snapshot creation request corresponds to. Thus, the controller may send one or more instructions to a central controller at the cluster to actually perform the snapshot creation request as specified by the user. In other approaches method 550 may be performed by a controller at the cluster location itself, whereby the controller may actually send one or more instructions to a data controller to actually perform the snapshot creation request. In still other approaches, method 550 may be performed by a controller in a data storage location itself such that the snapshot creation request may be satisfied by simply performing the snapshot creation specified in the request.

Moreover, from operation 562, the flowchart of FIG. 5D proceeds to operation 564, whereby method 550 may end, e.g., as described above.

It follows that the processes in method 550 are able to successfully and efficiently process requests that are received while also ensuring security of the overall system is maintained. It should also be noted that while the processes included in method 550 are described in the context of receiving a snapshot creation request, one or more of these processes in method 550 may be performed in response to receiving other types of snapshot related requests, e.g., such as snapshot deletion requests, snapshot modification requests, requests to transfer a snapshot to a different storage location, etc.

Accordingly, various ones of the approaches included herein are desirably able to enhance filesystem to have quotas for snapshot related operations initiated by each of the users having access to a given cluster. Moreover, by dynamically allocating (e.g., throttling) the snapshot quotas based on the changing risk score corresponding the user, approaches herein are able to improve security and performance. These approaches will help mitigate the risks associated with containerized workloads that allow for risky users to generate a series of snapshots or cloning entities that may directly impact the health, availability, and performance of the system in a negative manner. These improvements are also relevant for edge computing environments which involve workloads that are being deployed on container platforms and edge environments.

As noted above, a user ID may be used to look up the snapshot quota that corresponds to the respective user, e.g., by using a lookup table. For instance, looking now to FIGS. 6A-6B, two different lookup tables 600, 650 are illustrated in accordance with two different in-use examples which are in no way intended to limit the invention. Specifically, the lookup table 600 in FIG. 6A corresponds to an in-use example where a user owning a POD and the identification of the file and/or fileset which maps to the POD on the storage do not match. In this case the proposed system will maintain the mapping table 600 illustrated which is accessible to the storage system, threat management modules and/or software, virtualization software, etc. With respect to the present description, it should be noted that the term "POD" refers to the smallest deployable units of computing that can be created and managed in a given system (e.g., such as Kubernetes). A Pod may thereby represent a group of one or more containers, with shared storage and network resources, and a specification for how to run the containers, e.g., as would be appreciated by one skilled in the art after reading the present description.

As mentioned above, the table 600 will be continually updated such that when the threat management module identifies that a risk score of a user is above a threshold limit (e.g., where the threshold limit is set based on business policies), the rule will refer to the above table to identify the storage resources owned by the user and likewise trigger the throttling for snapshots/cloning at the storage level. Moreover, this risk score "User Risk Score" is associated with a particular user based on the user ID (UID) and/or group ID (GID). The one or more PODs that are managed (e.g., owned) by each user "PODs Owned" as well as the different volumes "Volumes Owned" are also indicated in table 600. Furthermore, the mapping of these volumes to the filesets and/or files in storage is also indicated and may actually be used to access the volume, e.g., as would be appreciated by one skilled in the art after reading the present description.

Moreover, table 650 depicts how to limit the snapshots and/or clones that can be formed on a given file, fileset, directory, filesystem, etc., at a storage level in accordance with an in-use example. While there are various ways of implementing this limiting, one possible option is for the corresponding filesystem to maintain a list of snapshots per file, fileset, filesystem, etc. The table 650 is depicted as indicating the "File/Fileset Name" as well as the "Current Number of Snapshots" that have already been created for that particular file/fileset in a given amount of time. The "Snapshot Quota" also indicates the maximum number of snapshots that can be created for the named file/fileset in the given amount of time (e.g., a week, 24 hours, one month, etc.). The "Last Snapshot Timestamp" indicates a time that a most recent snapshot was created, while the "Minimum Interval Between Snapshots" further indicates the minimum amount of time that can separate two different snapshot creations. For example, 12 hours indicates that 12 hours must pass from a last snapshot creation before another snapshot can be formed, while 1 hour indicates that only 1 hour must pass from a last snapshot creation.

As a result, this table 650 (e.g., database) is updated constantly, where the "Snapshot Quota", "Minimum Interval Between Two Snapshots" and "User ID" are values that can be set by the storage administrator (e.g., say via Representational State Transfer API). Accordingly, for each snapshot function call, the filesystem may introduce a check to refer to table 650 and validate if the snapshot to the given file, fileset, filesystem, etc., should be executed or not, e.g., based on the corresponding risk score and snapshot quota.

It should also be noted that the improvements achieved by the various approaches described herein may be extended to cloud computing environments as well. For instance, some cloud vendors leverage Infrastructure Provisioning Units (IPUs), such that all control operations from an end user are routed to a special hardware in order to save on the compute host CPU cycles. This framework helps in dynamically changing the rate limits (e.g., over provisioning vs. under provisioning) of the control plane based on the user's risk score being tracked by a threat management module.

In cloud hosted container orchestration platforms, snapshots that are generated may also be backed up to object storage, where object storage economics are calculated based on the amount of data that is stored in active pools vs. archive pools. Again, the proposed framework is thereby able to dynamically change the object storage pools based on the risk scores.

According to an example, which is in no way intended to limit the invention, by default every developer is given a snapshot quota for each container (e.g., POD) owned by the given developer. For instance, each developer (e.g., user) is assigned a default snapshot quota of 100 snapshot related actions per month. Thus, if User A's risk score moves above the corresponding threshold limit of 100 snapshot related actions per month, User A may be deemed as being a risky user. The snapshot quota assigned to User A may thereby be decremented, e.g., to 50 snapshot related actions per month, and not more than 10 in any given 24 hour period. This prevents User A (who may be starting to become malicious) from intentionally negatively affecting the system, e.g., by creating a series of unwanted snapshots.

It is to be understood that although this disclosure includes a detailed description on cloud computing, implementation of the teachings recited herein are not limited to a cloud computing environment. Rather, approaches of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
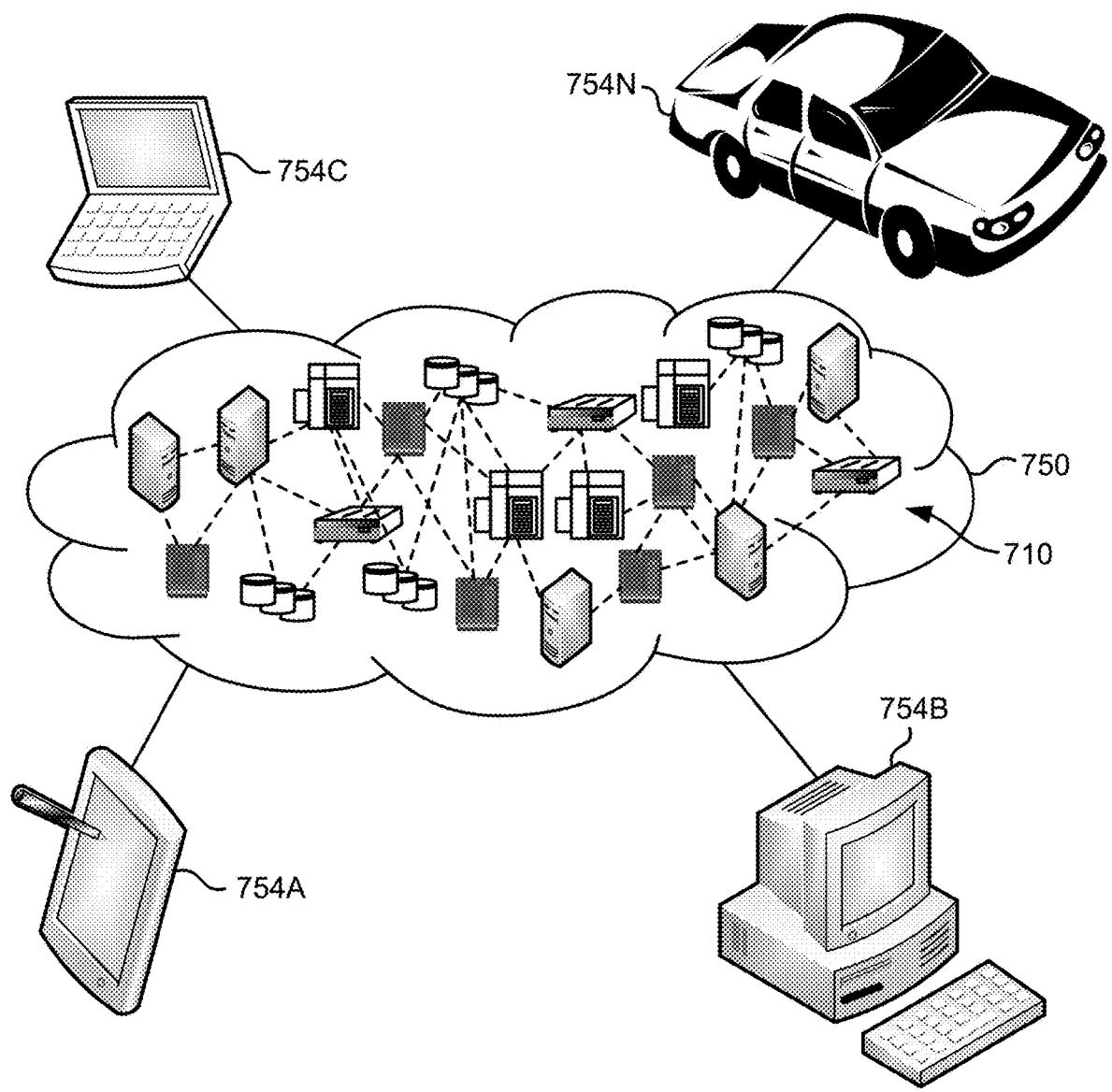
FIG. 7 is a representational view of a cloud computing environment in accordance with one approach.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-754N shown in FIG. 7 are intended to be illustrative only and that computing nodes 710 and cloud computing environment 750 can communicate with any type of computerized device over any type of network and/or network addressable connection (e.g., using a web browser).

Figure 8:
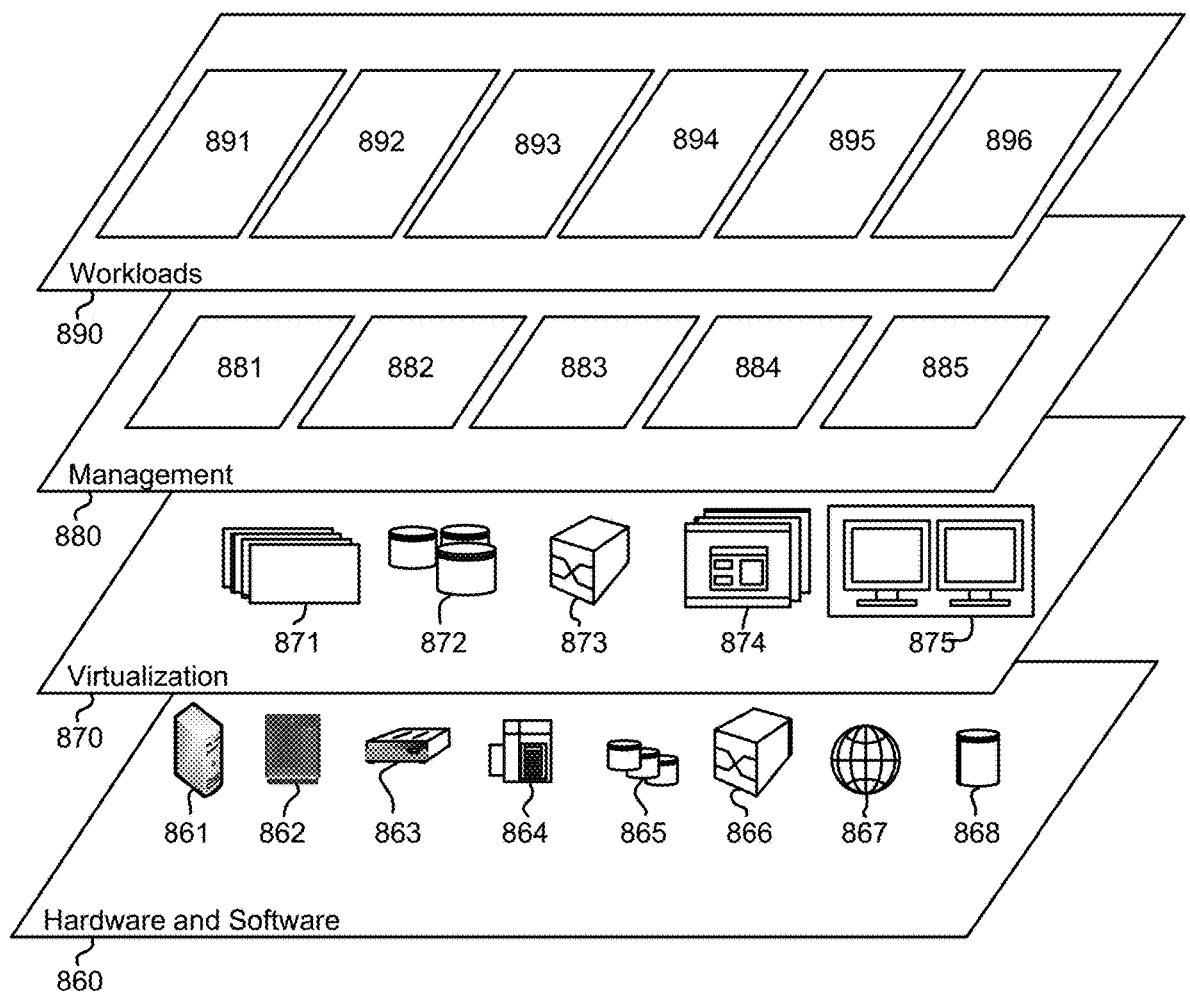
FIG. 8 is a representational view of abstraction model layers in accordance with one approach.

Referring now to FIG. 8, a set of functional abstraction layers provided by cloud computing environment 750 (FIG. 7) is shown. It should be understood in advance that the components, layers, and functions shown in FIG. 8 are intended to be illustrative only and approaches of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some approaches, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and dynamically allocate (e.g., throttle) snapshot action limits per defined time period for each user based on the user's changing risk score 896, e.g., according to any of the approaches described and/or suggested herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   monitoring actions of a first user having access to a cluster;
   identifying a second user that shares an operational relationship with the first user;

in response to determining that the first user has performed a risk event:
  incrementing a risk score assigned to the first user, and
  adjusting a risk score assigned to the second user such that it matches the incremented risk score assigned to the first user;
determining whether the incremented risk score is outside a predetermined range; and
in response to determining that the incremented risk score is outside the predetermined range:
  dynamically reducing a snapshot quota assigned to the first user, and
  adjusting a snapshot quota assigned to the second user such that it matches the snapshot quota assigned to the first user,
  wherein the snapshot quotas limit a number of snapshots that may be formed in response to requests received from the respective first and second users in a given amount of time.

2. The computer-implemented method of claim 1,
wherein each user having access to the cluster has a unique snapshot quota assigned thereto,
wherein the unique snapshot quota assigned to a given one of the users having access to the cluster limits: a number of snapshots the given one of the users is permitted to form for each fileset in the cluster in a first amount of time, and a number of clones the given one of the users is permitted to form of each file in the cluster in the first amount of time.

3. The computer-implemented method of claim 2, wherein the unique snapshot quotas are updated dynamically over time.

4. The computer-implemented method of claim 1, comprising:
  detecting two or more user identifications that have access to the cluster and which correspond to the first user;
  assigning, to each of the two or more user identifications, the incremented risk score that is assigned to the first user; and
  replacing a unique snapshot quota assigned to each of the two or more identifications with the snapshot quota assigned to the first user.

5. The computer-implemented method of claim 1, wherein dynamically reducing the snapshot quota assigned to the first user includes:
  sending identification information associated with the first user to data storage; and
  sending one or more instructions to the data storage to apply the snapshot quota to the first user.

6. The computer-implemented method of claim 1, comprising:
  determining an amount of time that has passed since the first user last performed a risk event;
  in response to determining that the amount of time that has passed since the first user last performed a risk event is outside a second predetermined range, decrementing the risk score assigned to the first user; and
  in response to determining that the decremented risk score is not outside the predetermined range, dynamically increasing the snapshot quota assigned to the first user.

7. The computer-implemented method of claim 1, wherein the risk event includes attempting to access data the first and/or second users do not have access to and/or tailgating.

8. The computer-implemented method of claim 1, comprising:
  receiving a snapshot creation request from the first user;
  using the snapshot quota assigned to the first user to determine whether the snapshot creation request should be satisfied; and
  in response to determining that the snapshot creation request should not be satisfied:
    rejecting the snapshot creation request,
    flagging the first user as having attempted to exceed the snapshot quota assigned to the first user,
    decrementing the snapshot quota assigned to the first user, and
    sending a warning to an administrator, the warning indicating that the snapshot creation request was denied.

9. The computer-implemented method of claim 1, wherein the operations are performed by a threat management module, wherein the threat management module is configured to communicate with the cluster, wherein the threat management module and the cluster are geographically separated from each other.

10. The computer-implemented method of claim 1, wherein monitoring actions of the first user having access to the cluster includes:
  receiving telemetry data corresponding to the actions of the first user;
  evaluating the telemetry data to determine whether the first user has performed a risk event.

11. A computer program product comprising one or more computer readable storage media having program instructions embodied therewith, the program instructions readable and/or executable by a processor to cause the processor to:
  monitor, by the processor, actions of a first user having access to a cluster;
  identify a second user that shares an operational relationship with the first user;
  in response to determining that the first user has performed a risk event:
    increment, by the processor, a risk score assigned to the first user, and
    adjust a risk score assigned to the second user such that it matches the incremented risk score assigned to the first user;
  determine, by the processor, whether the incremented risk score is outside a predetermined range; and
  in response to determining that the incremented risk score is outside the predetermined range;
    dynamically reduce, by the processor, a snapshot quota assigned to the first user, and
    adjust a snapshot quota assigned to the second user such that it matches the snapshot quota assigned to the first user,
  wherein the snapshot quotas limit a number of snapshots that may be formed in response to requests received from the respective first and second users in a given amount of time.

12. The computer program product of claim 11, wherein the snapshot quotas limit the number of snapshots the respective first and second users are permitted to form for each fileset in a first amount of time.

13. The computer program product of claim 12, wherein the snapshot quotas limit a number of clones the respective first and second users are permitted to form each file in a second amount of time.

14. The computer program product of claim 11, comprising:
- detecting two or more user identifications that have access to the cluster and which correspond to the first user;
- assigning, to each of the two or more user identifications, the incremented risk score that is assigned to the first user; and
- replacing a unique snapshot quota assigned to each of the two or more identifications with the snapshot quota assigned to the first user,
- wherein dynamically reducing a snapshot quota assigned to the first user includes:
  - sending identification information associated with the first user to data storage; and
  - sending one or more instructions to the data storage to apply the snapshot quota to the first user.

15. The computer program product of claim 11, wherein the program instructions are readable and/or executable by the processor to cause the processor to:
- determine, by the processor, an amount of time that has passed since the first user last performed a risk event;
- in response to determining that the amount of time that has passed since the first user last performed a risk event is outside a second predetermined range, decrement, by the processor, the risk score assigned to the first user; and
- in response to determining that the decremented risk score is not outside the predetermined range, dynamically increase, by the processor, the snapshot quota assigned to the first user.

16. The computer program product of claim 11, wherein the risk event includes attempting to access data the first and/or second users do not have access to.

17. The computer program product of claim 11, wherein the program instructions are readable and/or executable by the processor to cause the processor to:
- receive, by the processor, a snapshot creation request from the first user;
- use, by the processor, the snapshot quota assigned to the first user to determine whether the snapshot creation request should be satisfied; and
- in response to determining that the snapshot creation request should not be satisfied:
  - rejecting the snapshot creation request,
  - flagging the first and second users as having attempted to exceed the snapshot quota assigned to the first user,
  - decrementing the snapshot quotas assigned to the first and second users, and
  - sending a warning to an administrator, the warning indicating that the snapshot creation request was denied.

18. The computer program product of claim 11, wherein each user having access to the cluster has a unique snapshot quota assigned thereto, wherein the unique snapshot quota assigned to a given one of the users having access to the cluster limits: a number of snapshots the given one of the users is permitted to form for each fileset in the cluster in a first amount of time, and a number of clones the given one of the users is permitted to form of each file in the cluster in the first amount of time.

19. The computer program product of claim 18, wherein the unique snapshot quotas are updated dynamically over time.

20. The computer program product of claim 11, wherein the processor is coupled to a threat management module, wherein the threat management module is configured to communicate with the cluster, wherein the threat management module and the cluster are geographically separated from each other.

21. A system, comprising:
- a processor; and
- logic integrated with the processor, executable by the processor, or integrated with and executable by the processor, the logic being configured to:
  - monitor, by the processor, actions of a first user having access to a cluster;
  - detecting two or more user identifications that have access to the cluster and which correspond to the first user;
  - in response to determining that the first user has performed a risk event:
    - increment, by the processor, a risk score assigned to the first user, and
    - assign, by the processor to each of the two or more identifications, the incremented risk score that is assigned to the first user;
  - determine, by the processor, whether the incremented risk score is outside a predetermined range; and
  - in response to determining that the incremented risk score is outside the predetermined range:
    - dynamically reduce, by the processor, a snapshot quota assigned to the first user, and
    - assign, by the processor to each of the two or more identifications, the reduced snapshot quota that is assigned to the first user,
  - wherein the snapshot quota limits a number of snapshots that may be formed in response to requests received from the first user in a given amount of time.

22. The system of claim 21, wherein the snapshot quota limits the number of snapshots the first user is permitted to form for each fileset in a first amount of time, wherein the snapshot quota limits a number of clones the first user is permitted to form of each file in a second amount of time.

23. The system of claim 21, wherein dynamically reducing a snapshot quota assigned to the first user includes:
- sending identification information associated with the first user to data storage; and
- sending one or more instructions to the data storage to apply the snapshot quota to the first user.

24. The system of claim 21, wherein the logic is configured to:
- determine, by the processor, an amount of time that has passed since the first user last performed a risk event;
- in response to determining that the amount of time that has passed since the first user last performed a risk event is outside a second predetermined range, decrement, by the processor, the risk score assigned to the first user; and
- in response to determining that the decremented risk score is not outside the predetermined range, dynamically increase, by the processor, the snapshot quota assigned to the first user.

25. The system of claim 21, wherein each user having access to the cluster has a unique snapshot quota assigned thereto, wherein the unique snapshot quota assigned to a given one of the users having access to the cluster limits: a number of snapshots the given one of the users is permitted to form for each fileset in the cluster in a first amount of time, and a number of clones the given one of the users is permitted to form of each file in the cluster in the first amount of time, wherein the unique snapshot quotas are updated dynamically over time.

* * * * *